(12) United States Patent
Liu et al.

(10) Patent No.: US 10,581,804 B2
(45) Date of Patent: Mar. 3, 2020

(54) END-TO-END CACHING OF SECURE CONTENT VIA TRUSTED ELEMENTS

(71) Applicant: International Business Machines Corporation, Armonk, NY (US)

(72) Inventors: Su Liu, Austin, TX (US); Eric J. Rozner, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 15/246,144

(22) Filed: Aug. 24, 2016

(65) Prior Publication Data

US 2018/0060248 A1    Mar. 1, 2018

(51) Int. Cl.
*H04L 29/06* (2006.01)

(52) U.S. Cl.
CPC ............................. *H04L 63/0281* (2013.01)

(58) Field of Classification Search
CPC ......... G06F 2212/1052; G06F 12/1408; H04L 63/0281; H04L 63/0428; H04L 63/0464; H04L 67/2842
See application file for complete search history.

(56) References Cited

U.S. PATENT DOCUMENTS

| 5,892,825 | A | 4/1999 | Mages et al. |
| 6,029,168 | A | 2/2000 | Frey |
| 7,136,903 | B1 | 11/2006 | Phillips et al. |
| 7,555,656 | B2 | 6/2009 | Douceur et al. |
| 7,886,364 | B2 | 2/2011 | Douceur et al. |
| 8,266,234 | B1* | 9/2012 | Chapman ............ H04L 12/1877 709/208 |
| 2006/0143475 | A1* | 6/2006 | Herbert ............... H04L 63/0428 713/191 |
| 2008/0175190 | A1* | 7/2008 | Lee ........................ G06F 21/10 370/328 |
| 2014/0208384 | A1 | 7/2014 | Youssefian et al. |
| 2015/0310188 | A1 | 10/2015 | Ford et al. |
| 2017/0339242 | A1* | 11/2017 | Westphal ............ H04L 67/2842 |

OTHER PUBLICATIONS

Kallahalla et al. "Plutus: Scalable Secure File Sharing on Untrusted Storage." Fast. vol. 3. 2003.
Kubiatowicz et al. "Oceanstore: An architecture for global-scale persistent storage." ACM Sigplan Notices 35.11 (2000): 190-201.
Anderson et al. "Serverless network file systems." ACM Transactions on Computer Systems (TOCS) 14.1 (1996): 41-79.

* cited by examiner

*Primary Examiner* — Paul E Callahan
(74) *Attorney, Agent, or Firm* — Patterson + Sheridan, LLP

(57) ABSTRACT

The present disclosure relates to caching content at a device in a group of co-located devices whose owners share social network connections. In one embodiment, a method generally includes electing the device as a leader device based, at least in part, on shared social network connections associated with owners of each device in the group. The device receives a data request from a first user device and searches a cache for the data. If the data exists in the cache, the data is encrypted using an encryption key associated with an owner of the first user device transmitted to the first user device. Otherwise, the device requests the data from the content provider, receives an encrypted copy of the data, decrypts the data, and uses the encryption key associated with the owner of the first device to generate and transmit an encrypted message including the data to the first device.

14 Claims, 6 Drawing Sheets

END-TO-END CACHING OF SECURE CONTENT VIA TRUSTED ELEMENTS

BACKGROUND

The present invention relates to caching content at a network entity, and more specifically to using social network connection information to select a network entity to serve as a gateway and cache for accessing secure content by peer devices.

Networks generally have a limited amount of bandwidth to serve devices connected to a network. To serve data to devices connected to a network, a network gateway/proxy server/access point generally receives a request for data from a user device, transmits the request to a data source indicated in the request, receives the requested data, and provides the requested data to the requesting device. In some cases, usage patterns in a network indicate that different users are requesting the same content simultaneously. For small amounts of content (e.g., static webpages with limited or no multimedia content embedded in the webpage), repeated requests for the same content may have a limited effect on bandwidth availability for other users. However, if multiple users request the same multimedia content, such as live video content, repeated requests for the same content may reduce the amount of bandwidth available in the network. This reduction in bandwidth may result, for example, in degraded audio/video quality for the users requesting the same multimedia content and/or reductions in service availability for other users in the network.

To reduce the amount of bandwidth used in a network, a proxy server (e.g., in a network gateway or access point) can cache newly requested content. When a proxy server receives a request for content from a user device (e.g., a cell phone, handheld computer, tablet, laptop computer, etc.), the proxy server generally examines a cache at the proxy server to determine if the proxy server can serve the requested content without requesting the content from a remote content provider. If the requested content is cached (i.e., has been previously requested by another user device), the proxy server provides the cached content to the requesting user device without requesting that content from a remote source. By reducing duplicate requests for the same data, a caching system at a network entity can free up network bandwidth for other devices to request other data.

In some cases, user devices may request multimedia content using an encrypted connection. For example, requests for video content shared on a social network may be encrypted before being transmitted from a user device to a content provider. Because these requests are encrypted, the proxy server may not be able to identify the requested content or store the requested content at the proxy server for use in providing the same content to other user devices. Even though many users may request the same data from a content provider, the proxy server may request the content from the content provider for each requesting user instead of serving the content from a cache at the proxy server.

SUMMARY

One embodiment disclosed herein includes a method for caching encrypted content at a device based on social network connections. The method generally includes electing the device as a leader device in the group of co-located devices based, at least in part, on shared social network connections associated with owners of each device in the group of co-located devices. The device receives, from a first user device in the group of user devices, a request for data available from a content provider. Upon finding the data in the cache at the device, the device encrypts the data using an encryption key associated with an owner of the first user device and transmits the encrypted data to the first user device. Otherwise, upon determining that the data is not available in the cache, the device generates an encrypted request to obtain the data from the content provider. The encrypted request is transmitted to the content provider, and the device receives an encrypted copy of the data from the content provider. The device decrypts the copy of the data, uses the encryption key associated with the owner of the first device to generate an encrypted message including the data, and transmits the encrypted message to the first device.

Another embodiment includes a computer-readable storage medium having instructions, which, when executed on a processor, performs an operation for caching encrypted content at a device based on social network connections. The operations generally includes electing the device as a leader device in the group of co-located devices based, at least in part, on shared social network connections associated with owners of each device in the group of co-located devices. The device receives, from a first user device in the group of user devices, a request for data available from a content provider. Upon finding the data in the cache at the device, the device encrypts the data using an encryption key associated with an owner of the first user device and transmits the encrypted data to the first user device. Otherwise, upon determining that the data is not available in the cache, the device generates an encrypted request to obtain the data from the content provider. The encrypted request is transmitted to the content provider, and the device receives an encrypted copy of the data from the content provider. The device decrypts the copy of the data, uses the encryption key associated with the owner of the first device to generate an encrypted message including the data, and transmits the encrypted message to the first device.

Still another embodiment includes a processor and a memory storing a program, which, when executed on the processor, performs an operation for caching encrypted content at a device based on social network connections. The operations generally includes electing the device as a leader device in the group of co-located devices based, at least in part, on shared social network connections associated with owners of each device in the group of co-located devices. The device receives, from a first user device in the group of user devices, a request for data available from a content provider. Upon finding the data in the cache at the device, the device encrypts the data using an encryption key associated with an owner of the first user device and transmits the encrypted data to the first user device. Otherwise, upon determining that the data is not available in the cache, the device generates an encrypted request to obtain the data from the content provider. The encrypted request is transmitted to the content provider, and the device receives an encrypted copy of the data from the content provider. The device decrypts the copy of the data, uses the encryption key associated with the owner of the first device to generate an encrypted message including the data, and transmits the encrypted message to the first device.

DETAILED DESCRIPTION

Content caching generally reduces an amount of resources used by a network gateway/proxy server to serve content to connected devices. A proxy server stores requested content for an amount of time as devices request new content from a remote content provider. For subsequent requests for the same content, the proxy server serves the content to the requesting device without generating a request for that content from the content provider.

In some cases, proxy servers may not be able to cache data transmitted over a secure channel. Proxy servers may, for example, not be able to decrypt data transmitted over a secure channel to identify requested content and store content received from a content provider before passing the received content to the requesting device. In some cases, caching secure content may pose a security risk. For example, if the secure content includes personally-identifiable information (e.g., a user's Social Security Number) or payment-related information (e.g., credit card number, bank routing and account number, etc.), a proxy server may not be a trusted location to store such data.

In some cases, users may request data over a secure connection using social network credentials. Social network connections may indicate, for example, a user's friends, which may in turn be used as a proxy for indicating that a device associated with a friend is a trusted device. Because a device associated with a friend of a user may be considered a trusted device, that device may be used to cache secure content without a loss of privacy or security.

Embodiments presented herein describe techniques for using social network connection information to cache encrypted content at an elected leader device. By electing a leader device out of a group of co-located devices (e.g., devices connected to the same network) whose owners have common social network connections (e.g., belonging to people who are connected on a particular social networks), multiple user devices can use the elected leader device as a gateway for obtaining content from a content provider (e.g., from a social network in which multimedia content is shared). The leader device can cache content as different devices in the group of co-located devices request content from different content providers. As additional devices in the group of co-located devices request the same content, the leader device can serve the requested content from a cache at the elected leader device instead of passing a request to the remote content provider for such data.

Figure 1:
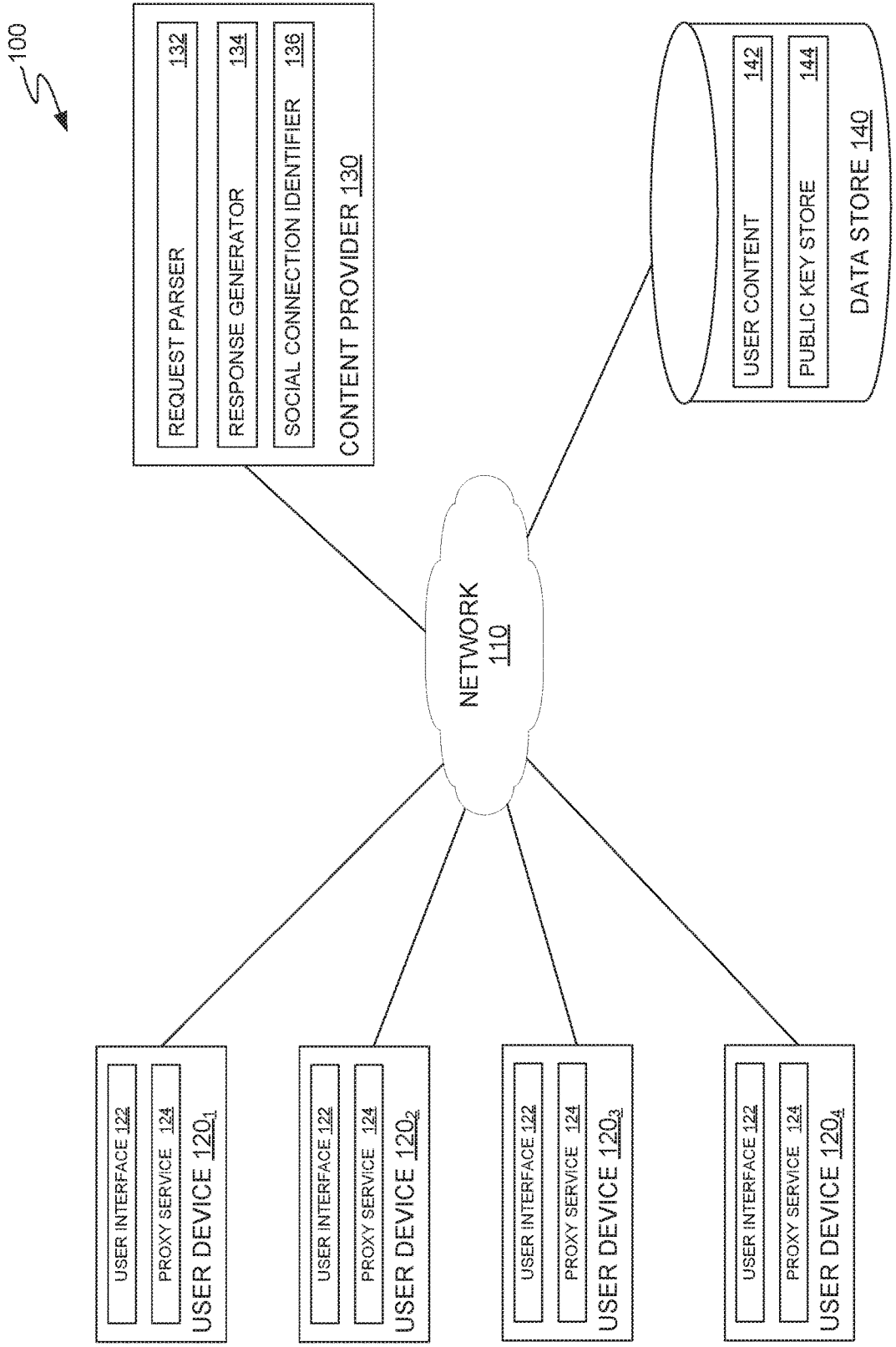
FIG. 1 illustrates an example computing system in which social network connection information is used to select a leader device for obtaining and caching encrypted content, according to one embodiment.

FIG. 1 illustrates an example computing environment in which social network connection information is used to elect a leader device for serving and caching content from a group of co-located devices whose owners have common social network connections, according to one embodiment. As illustrated, computing environment 100 includes a plurality of user devices 120, a content provider 130, and a data store 140.

User devices 120 generally include smartphones, handheld computers, tablets, laptops, or other computing devices that can access content from remote sources (e.g., on the internet). As illustrated, each user device 120 includes a user interface 122 and a proxy service 124.

User interface 122 generally allows a user of user device 120 to request content from one or more remote content providers 130. In some cases, to request content from a remote content provider 130, a user interface 122 may use social networking credentials or other social networking information as part of a request for data. In some cases, the social networking credentials may include a public-private key pair assigned by content provider 130 to a particular user. The public key may be stored on user device 120, and the private key may be stored in a remote data store accessible to content provider 130.

In a social networking application, a request for data may be encrypted using a public key associated with a user's account and transmitted to content provider 130. User device 120 receives a response from content provider 130 that is encrypted using the private key associated with the user's account. User device 120 decrypts the response using the public key and displays the contents of the response.

A group of user devices 120 may be co-located, or connected to the same network (e.g., access point), which may allow the group of user devices 120 to communicate with content provider 130 through an elected leader 120. To enable user devices 120 to obtain encrypted content from a cache, the group of user devices 120 can elect a leader device of the co-located user devices 120 having owners with shared social network connections. In some cases, the user devices 120 may elect a leader device autonomously (e.g., without a selection of the leader device by content provider 130). To elect a leader device out of the group of user devices 120 that are co-located and have owners with shared social network connections, a proxy service 124 at a user device 120 receives information about capabilities of each user device 120 and social network connection information for the owners of each user device 120.

To select a leader, proxy service 124 first examines the social network connections of each owner of the user devices 120. For example, assume that Ann owns user device $120_1$, Bill owns user device $120_2$, Charlie owns user device $120_3$, and David owns user device $120_4$. Assume also that Ann, Bill, and Charlie are each friends (e.g., are common connections in a social network), but that David is friends with Bill, but not with Ann or Charlie. Based on the social network connections between the owners of the user devices 120, proxy service 124 can elect a leader device for the group of user devices $120_1$, $120_2$, and $120_3$.

After identifying a subset of user devices 120 for which the owners share social network connections, proxy service 124 examines the capabilities and/or state information associated with user devices $120_1$, $120_2$, and $120_3$ to elect a leader device. The capabilities may include, for example, available bandwidth at a user device, an ability to support communications on multiple radio access technologies, and so on. An ability to support communications on multiple radio access technologies may include, for example, an ability to access content provider 130 using a wide area network connection (LTE, UMTS, 1×EVDO, etc.) and to provide data to other user devices 120 using a local area network connection (e.g., Wi-Fi, Bluetooth, NFC, etc.). The state information associated with the user devices may include, for example, remaining battery life, whether the user device is plugged into mains power, signal strength, and so on. The user devices 120 can elect a leader, for example, that can provide point-to-point communications between the leader device and the other user devices 120 and is plugged into mains power or has the highest remaining battery life. When a new user device 120 enters network 110, the user devices 120 can examine the social network connections for the owner of the new user device and update the leader selection based on shared social network connections for owners of the existing user devices 120 and the owner of the new user device 120.

To enable end-to-end encrypted communications between the user devices 120 and content provider 130 via the elected leader 120, the elected leader device 120 can obtain the public keys for each of the user devices 120 that use the elected leader device 120 as a gateway or proxy server. Each of the user devices 120 can share its public key with the elected leader device 120 upon election of the leader device 120. In some cases, if content provider 130 is configured to share the public keys for members of a social network, the elected leader device 120 can request the public keys for each of the user devices 120 from content provider 130. As discussed in further detail herein, the elected leader device 120 can use the public keys for each of the user devices 120 to encrypt data received from a content provider 130 before transmitting the requested data to the appropriate user device 120.

In some cases, upon election of the leader device 120, the elected leader device can generate a shared key that the group of user devices 120 can use to encrypt data requests transmitted to the elected leader device and responses to the data requests transmitted from the elected leader device to user devices 120 in the group of user devices. The elected leader device can transmit the shared key directly to each of the one or more devices in the group of co-located user devices 120. Proxy service 124 at the elected leader device 120 can receive encrypted requests from one or more user devices 120 in the group of co-located user devices and decrypt the requests using the shared key. As discussed herein, based on the decrypted requests, the elected leader device can obtain the requested data from a content provider 130, a local cache at the elected leader device, or from a content cache at another user device 120 in the group of co-located user devices. After obtaining the requested data, the elected leader device can provide the data (encrypted using at least the shared key) to one or more devices 120 in the group of co-located devices.

In some cases, each of the user devices 120 may have cached data from content provider 130 before electing a leader device. Because each of the co-located user devices in a group that shares an elected leader device have common social network connections, the user devices 120 may have already downloaded data from content provider 130 that other user devices 120 in the group may want to obtain from content provider 130. To allow user devices 120 to obtain data that has already been downloaded by one of the user devices 120, each of the user devices 120 in a group that shares an elected leader device can transmit the downloaded content or metadata indicating locally cached content to the elected leader device after the user devices 120 elect the leader device. If a user device $120_1$ transfers metadata to the elected leader device, the elected leader can cache the content or, upon determining that another user device $120_2$ has requested the data cached at user device $120_1$, can invoke a transfer of the requested data from user device $120_1$ to user device $120_2$. The transfer of the requested data from user device $120_1$ to user device $120_2$ may be performed through the elected leader device. In some cases, however, the elected leader device can instruct user device $120_2$ to establish a peer-to-peer connection with user device $120_1$ and obtain the requested data from user device $120_1$.

After user devices 120 elect a leader device, the user devices 120 can transmit requests for data from content provider 130 to the elected leader device. The requests for data may be encrypted using the public key of the owner of the leader device or the shared key established upon election of the leader device. To determine whether the requested content is cached at the elected leader device, proxy system 124 at the elected leader device can use the private key of the owner of the leader device to decrypt the request and extract information identifying the requested data from the request. If the requested data is available in the cache of proxy system 124, the proxy system can retrieve the requested content from the cache (without requesting the data from content provider 130).

Otherwise, the requested data is not available in the cache of proxy system 124, and thus, proxy system may transmit the request to content provider 130 to obtain the requested data. In some cases, proxy system 124 can aggregate requests from a plurality of user devices 120 into a single request to transmit to content provider 130. To generate an aggregated request, proxy system 124 can associate each request in the aggregated request with an identifier of the requesting station. The proxy system 124 can then encrypt the aggregated request using a public key of a public/private key pair established for communications between the elected leader device and the content provider 130 and transmit the aggregated request to content provider 130 for further processing. In some cases, the aggregated request can be augmented to include data about which device is making which request.

In response to transmitting the aggregated request to a content provider 130, the elected leader device may receive an aggregated response from the content provider. The aggregated response may be, in some cases, encrypted using the public key of the owner of the elected leader device. The aggregated response, in some cases, may include data encrypted using the public keys associated with owners of the intended recipient(s) of the data contained in the aggregated response. On receipt of the aggregated response, proxy service 124 uses the private key of the owner of the elected leader device to decrypt the aggregated response. The aggregated response generally includes multiple entries associating a particular set of content with one or more destination user device 120. Each entry may, for example, be a two-tuple of {content, [requesting devices]}. For each item of content, proxy service 124 at the elected leader device generates a message intended for each destination user device 120 encrypted using the public key of the owner of each destination user device 120 identified as an intended recipient of the content. For items of content that are already encrypted in the aggregated response, proxy service 124 can apply a second round of encryption to those items of content using the public key of the owner of the destination user device 120 before transmitting the content to the destination user device 120. In some cases, if proxy service 124 determines that an item of content intended for a destination user device 120 is already encrypted, proxy service 120 need not apply an additional round of encryption to the item of content. Proxy service 124 transmits the encrypted messages to the destination user devices 120.

In some cases, proxy service 124 at the elected leader device 120 can cache content received from content provider 130 after decrypting the aggregated response transmitted to the elected leader device. When proxy service 124 caches content received from content provider 130, the content may be associated with an expiration time. If one or more of the co-located user devices 120 that use the elected leader device as a gateway to content provider 130 requests content that is cached at proxy service 124, proxy service 124 can reset the expiration time for the content. If none of the co-located user devices 120 request the content by the expiration time, proxy service 124 at the elected leader device can delete the cached content. Deleting cached content that is not requested after a period of time can reduce amount of storage space at the elected leader device 120 dedicated to caching content.

In some cases, leader election, public key distribution, content caching, and request aggregation and processing may be performed by a social media application installed on each user device 120. The social media application may include proxy service 124, which, as discussed above, may aggregate information about neighboring user devices 120 to identify a leader device among a group of user devices 120 whose owners share connections in a social network. At the elected leader device 120, the social media application including proxy service 124 can request public key information from corresponding social media applications installed on neighbor devices or from a key distribution service at a content provider 130. After obtaining public keys associated with owners of the user devices 120 in a group of co-located devices, the elected leader device can receive data requests from the devices in the group of co-located devices and obtain data from content provider 130, a cache at the elected leader device 120, or cached data at user devices 120 in the group of co-located devices.

Content provider 130 generally provides requested content to the elected leader device 120 to be distributed to the requesting user devices 120 that are co-located and communicate with content provider 130 through the elected leader device 120. As illustrated, content provider includes a request parser 132, response generator 134, and social connection data 136.

Request parser 132 generally receives a request for data from the elected leader device 120 and decomposes the request to identify the content requested by the leader device and one or more co-located user devices 120. The received request may be encrypted using a public key for transmitting requests to a content provider 130, and content provider 130 can use the corresponding private key to decrypt the received request. The request received from the elected leader device, as discussed above, generally includes a plurality of two-tuples identifying requested content and the one or more user devices 120 that have requested the content.

Request parser 132 generally provides the decrypted request to response generator 134 for further processing. Response generator 134 generally obtains content identified in the request from a remote data source (e.g., user content 142 at data store 140). For each two-tuple of {content identifier, [requesting devices]}, response generator 134 generates a two-tuple of {content, [requesting devices]} to provide the content to the elected leader device and identify the one or more user devices 120 that the elected leader device is to distribute the content to. When response generator 134 generates the two-tuples of {content, [requesting devices]} needed to satisfy the received request, response generator 134 aggregates the generated two-tuples of {content, [requesting devices]} into a single response message and encrypts the response message using the public key associated with the owner of the elected leader device.

In some cases, for content that should remain secure, response generator 130 can encrypt the content with the public key associated with a requesting user device 120. Because the elected leader device may not have the private keys associated with each user device 120, the elected leader device may not be able to decrypt the encrypted content to identify the data to be transmitted to the requesting user device 120. The elected leader device may act as a pass-through or conduit for encrypted content and may not cache the content.

Social connection identifier 136 generally provides data that user devices 120 can use to elect a leader device for communications between a plurality of user devices 120 and content provider 130. In some cases, each user device can transmit location data and a user identifier to social connection identifier 136. The location data may include, for example, a network identifier for the network that a user device 120 is connected to, an access point identifier for the access point that a user device 120 is connected to, satellite positioning system location data identifying the geographical location of a user device, or other location data that can be used to determine that one or more user devices are co-located. Social connection identifier 136 can use the received user identifiers associated with the same location data (e.g., identifiers of a plurality of user devices that are co-located, or connected to the same network) to identify a group of user devices 120 that can elect a leader for communications between the group of user devices 120 and content provider 130. To aid in the leader election process, social connection identifier can transmit a message to each user device 120 in the group of user devices 120 that identifies the members of the co-located group with common social network connections. As discussed above, proxy services 124 at each of the user devices 120 can use the information identifying members of the co-located group with common social network connections to elect a leader for communications between the group of user devices 120 and content provider 130. In some cases, the information identifying members of the co-located group with common social network connections may include the public keys associated with the owner of each device in the group of co-located user devices 120. As discussed above, to maintain end-to-end security of data transmitted from content provider 130, the elected leader device can use the public keys to encrypt requested content before transmitting the requested content to a requesting user device 120. Additionally, the user devices 120 in the group of co-located user devices 120 can obtain the public key associated with the owner of the elected leader device to encrypt data requests before transmitting those requests to the elected leader device.

Data store 140 generally provides a repository to store content to be provided to one or more user devices 120. As illustrated, data store 140 generally includes user content 142 and public key store 144.

User content 142 may be implemented as a content management system or other relational database that includes an association of a content identifier with user data. In a social networking application, the content identifier may, for example, include a user identifier identifying the user that generated the content and a unique identifier associated with the content. In some cases, such as media streaming, user content may associate a content identifier with a link to a resource stored at a content delivery system. Generally, as discussed herein, a content provider 130 can obtain data from user content 142 and pass the data to a user device 120 via the elected leader device.

Public key store 144 generally provides a repository to store the public encryption keys associated with each owner of a user device 120. The public encryption keys may be generated by a social networking application when a user joins a social network as part of a public/private key pair used to encrypt and decrypt messages transmitted between an owner of a user device 120 and content provider 130. When a group of user devices 120 elect a leader, one or more public keys stored at public key store 144 may be provided to the elected leader device for use in encrypting messages (e.g., responses to content requests) sent from the elected leader device to the other devices in the group of user devices 120.

Figure 2:
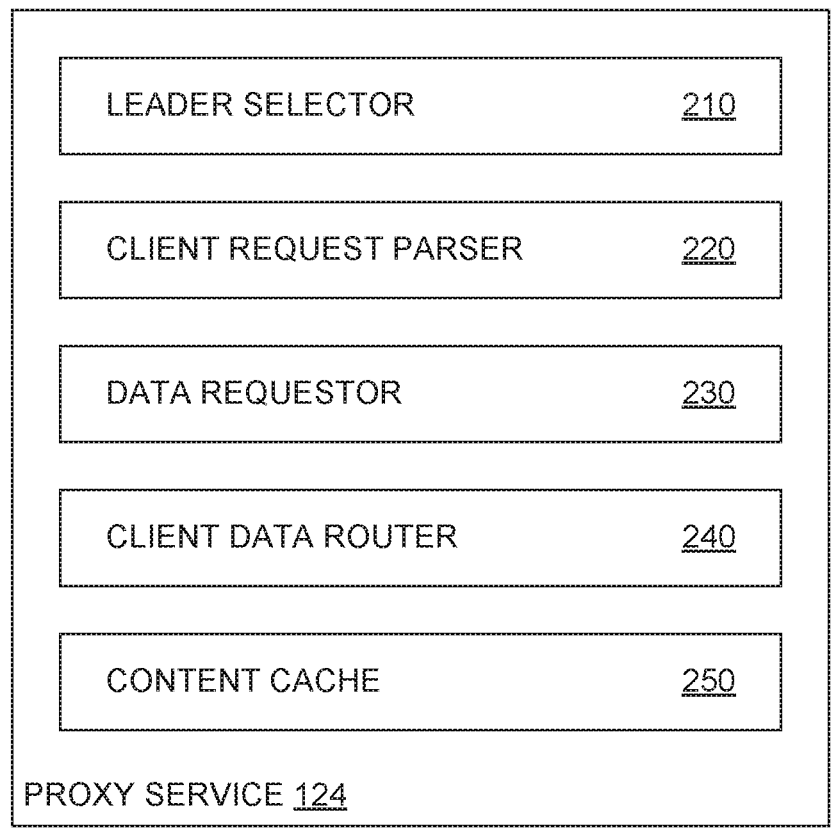
FIG. 2 illustrates an example proxy service at an elected leader device in a group of co-located peer devices for obtaining and caching encrypted content, according to one embodiment.

FIG. 2 illustrates an example proxy service 124, according to an embodiment. As illustrated, proxy service 124 includes leader selector 210, client request analyzer 220, data requestor 230, client data router 240, and content cache 250.

Leader selector 210 generally uses information about the capabilities and state of a group of co-located user devices 120 to elect a leader device. As discussed herein, the leader device may be the device through which members of the group of co-located user devices 120 communicate with content provider 130 and may cache data requested by devices in the group of co-located user devices 120 to reduce an amount of bandwidth used to serve requests for the same data. To elect a leader device, leader selector 210 can request information about the communications capabilities of each user device 120 in the group of co-located user devices (e.g., a number of network interfaces, an ability to serve an as access point for other devices, and so on). Leader selector 210 can also request information about the state of each user device 120 in the group of co-located user devices. The state information may include, for example, remaining battery life for each user device 120, whether a user device 120 is connected to mains power, signal strength for a user device's connection to a network, and so on.

When leader selector 210 elects a leader device in the group of co-located user devices 120, leader selector 210 at the elected leader device 120 obtains the public keys associated with the owners of each of the co-located user devices 120. The public keys for each of the co-located user devices 120 can be used, as discussed herein, by proxy service 124 to encrypt data transmitted from the elected leader device to the co-located user devices 120. To obtain the public keys associated with the owners of each of the co-located user devices 120, leader selector 210 can request a public key from each of the co-located user devices 120 in the group of co-located user devices or from a centralized key distribution service at content provider 130. Leader selector 210 at the elected leader device 120 may additionally provide the public key associated with the owner of the elected leader device 120 to Client request analyzer 220 generally receives encrypted requests for data from one or more user devices 120 in the group of co-located user devices 120 with owners having shared social network connections. The encrypted requests for data from a user device 120 in the group of co-located user devices 120 may be encrypted using a public key of the elected leader device 120 or a shared key for the group of co-located user devices generated upon election of the leader device. To identify the data requested by a user device 120, client request analyzer 220 decrypts the encrypted request from a user device 120 using the private key associated with the owner of the elected leader device or the shared key generated for the group of co-located user devices 120. Client request 220 may subsequently extract an identifier of the requested content from the decrypted request.

To determine whether to request the identified content from content provider 130, client request analyzer 220 examines content cache 250 for the identified content. If the identified content is available from content cache 250, client request analyzer need not pass the content identifier to data requestor 230 for transmission of an aggregated data request to content provider 130. In such a case, because the data is already available in content cache 250, client request analyzer 220 can request the content from content cache 250 and provide the requested content and an identifier of the requesting user device 120 to client data router 240 for forwarding to the requesting user device 120.

If the requested content is not available at content cache 250, proxy service 124 may need to obtain the requested content from a content provider 130. To obtain the requested content, client request analyzer 220 provides identifiers of the requested content and the requesting user device 120 to data requestor 230, where proxy service 124 generates a request for data from a content provider 130.

Data requestor 230 generally generates and transmits requests for data from a content provider 130 to obtain, from the content provider 130, data that has not been cached at the elected leader device and has been requested by one or more co-located user devices 120. Data requester 230 can generate the request by aggregating multiple requests for data from different co-located user devices 120. An aggregated request may include a plurality of two-tuples identifying the requested content and the one or more user devices 120 that have requested the data.

In some cases, data requestor 230 may transmit data requests to the content provider 130 without aggregating requests for data from multiple co-located user devices 120. In such a case, data requestor 230 may decrypt the data request from a co-located user device 120 and encrypt the data request using a key established for communications between the elected leader device and the content provider 130. As discussed herein, upon receiving the requested content (encrypted using a key established for communications between the elected leader device and the content provider 130), client data router 240 can decrypt the requested content, encrypted the content using the public key associated with the owner of the requesting user device 120, and transmit the encrypted content to the requesting user device 120.

Data requestor 230 encrypts the aggregated request using a key established for communications between the elected leader device and content provider 130 and transmits the encrypted request to content provider 130. In response, data requestor 230 receives an encrypted message including the requested data and routing information indicating the stations that should receive the requested data. Data requestor 230 uses the key established for communications between the elected leader device and content provider 130 to decrypt the response message. After decrypting the response message, data requestor 230 can store the requested content and the associated content identifiers in content cache 250. As discussed herein, by caching data in content cache 250 at an elected leader device, the elected leader device can reduce a number of times the same data is downloaded from content provider 130.

Client data router 240 receives the decrypted response message from data requestor 230 and generates one or more messages to transmit the received data to the group of co-located user devices 120 that communicate with content provider 130 via the elected leader device. A response message generated by client data router 240 may include a plurality of two-tuples of {content identifier, content} and may be encrypted using the public key associated with an owner of the destination user device 120. After encrypting the response message with the appropriate public key, client data router 240 transmits the response message to the destination user device 120.

Content cache 250 provides a repository at an elected leader device where content requested by one or more co-located user devices can be temporarily stored. After content has been downloaded from content provider 130 and stored in content cache 250, proxy service 124 can provide requested content from content cache 250 instead of requesting already-cached content from content provider 130. Content cache 250 may be structured, for example, as a relational database a content identifier is associated with each unique item of content stored in content cache 250. In some cases, each item of content cached at content cache 250 may further include an expiration time. If user devices 120 do not request a particular item of content by the expiration time, content cache 250 can delete that item, which may free space in content cache 250 for the elected leader device to cache more recently requested content.

Figure 3:
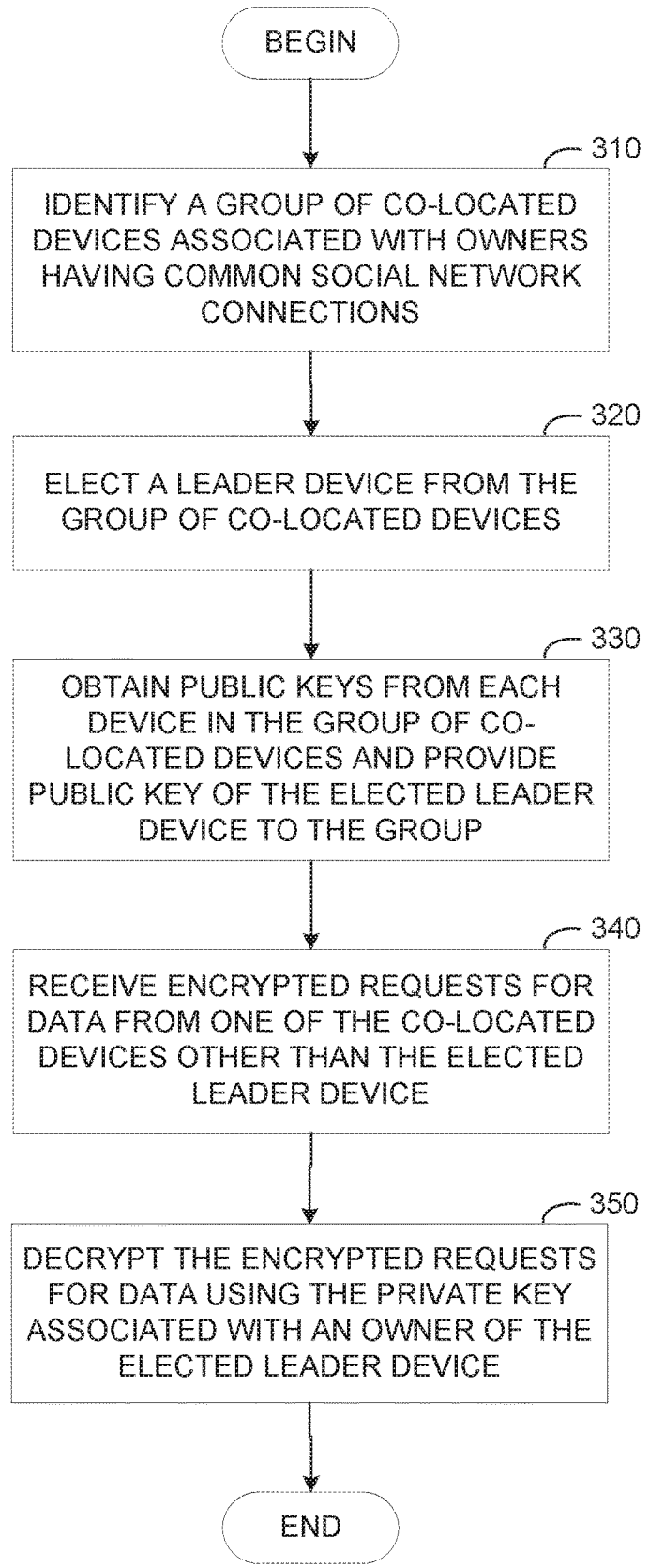
FIG. 3 illustrates example operations for initializing a proxy service at an elected leader device, according to one embodiment.

FIG. 3 illustrates example operations that may be performed by a user device 120 to elect the user device as the leader device in a group of co-located user devices 120 whose owners share social network connections, according to an embodiment. As illustrated, operations 300 begin at step 310, where a user device identifies a group of co-located devices associated with owners having common social network connections. The user device can receive information, for example, from content provider 130 indicating a group of co-located user devices based on location data (e.g., network identifier, satellite positioning system (SPS) location data, and so on) received from each member of the group of co-located user devices. In some cases, the user device may be able to detect co-located user devices connected to the same network (e.g., access point or base station) and may request social network connection information from each of the co-located user devices.

At step 320, the user device elects a leader device from the group of co-located devices. To elect a leader device, a proxy service at the user device requests information about the capabilities and state of each user device in the group of co-located devices. The proxy service can, for example, elect a user device as the leader device by selecting the user device with the largest amount of available bandwidth and with the longest expected battery life (which may be defined as an indefinite amount if the user device is plugged into mains power). Upon election, the elected leader device can broadcast an identifier of the elected leader device to the group of co-located devices to inform the group of co-located devices to perform subsequent accesses to content provider 130.

At step 330, the elected leader device obtains public keys from each device in the group of co-located devices and provides the public key of the elected leader device to the devices in the group of co-located devices. In some cases, the elected leader device can request public keys from each of the co-located user devices other than the elected leader device. In some cases, where content provider 130 includes as key distribution service, the elected leader device can request the public keys associated with each of the co-located devices from content provider 130.

At step 340, the elected leader device receives encrypted requests for data from one of the co-located devices other than the elected leader device. At step 350, the elected leader device decrypts the request for data using the public key associated with the owner of the elected leader device.

Figure 4:
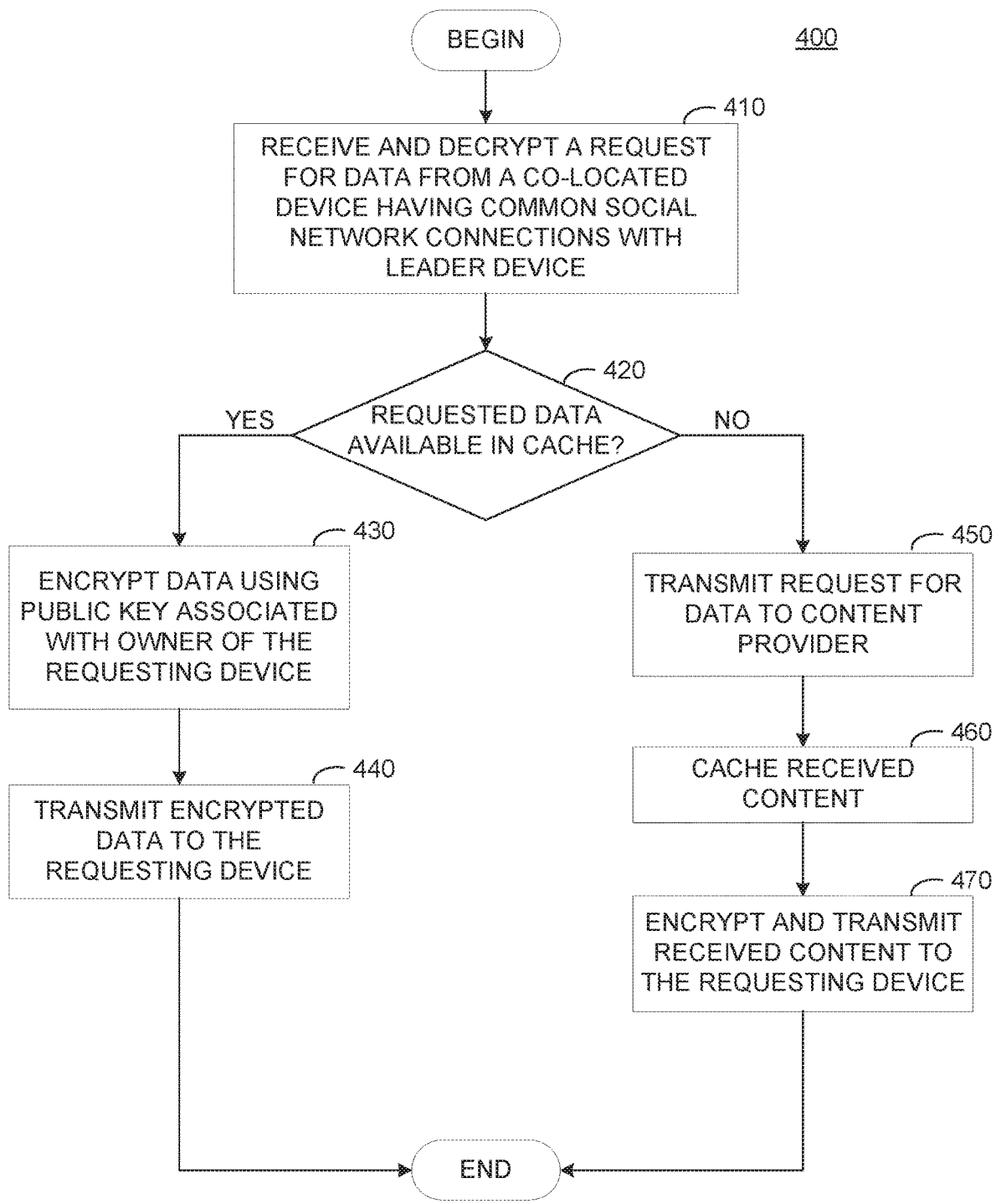
FIG. 4 illustrates example operations for processing, at an elected leader device, a request for data from a co-located peer device, according to one embodiment.

FIG. 4 illustrates example operations that may be performed by an elected leader device to request data from a cache at the elected leader device or from a content provider 130, according to an embodiment. As illustrated, operations 400 begin at step 410, where the elected leader device receives and decrypts a request for data from a co-located device having common social network connections with the leader device. The request generally includes one or more content identifiers associated with the content that a user of the co-located user device 120 wishes to obtain from content provider 130.

At step 420, the elected leader device determines whether the requested data is available in a cache at the elected leader device. The elected leader device can use the content identifiers included in the decrypted request for data to examine the cache for associated content. If the requested data is available in the cache (e.g., a search for data associated with the content identifier returns non-null data), at step 430, the elected leader device 430 encrypts the data using the public key associated with the owner of the requesting device. At step 440, the elected leader device transmits the encrypted data to the requesting device.

If, however, the requested data is not available in the cache, at step 450, the elected leader device transmits a request for the data to a content provider. In some cases, the request for data may be included in an aggregated request transmitted to content provider 130. The aggregated request may include, for example, a plurality of content identifiers and a list of user device identifiers associated with each content identifier. The list of user device identifiers generally identifies each user device that has requested a particular item from content provider 130.

At step 460, the elected leader device caches content received from the content provider. To ensure end-to-end encryption of data, the content provider may transmit content to the elected leader device in a message encrypted using, for example, the public key associated with an owner of the elected leader device. The elected leader device decrypts the message using the private key associated with the owner of the elected leader device and commits the content and associated content identifiers to a content cache. As discussed herein, by caching content at the elected leader device, the elected leader device can serve requests for the same data using a single content download from content provider 130, which may reduce an amount of bandwidth used by the group of co-located user devices to request data from content provider 130.

At step 470, the elected leader device encrypts and transmits the received content to the requesting device. The elected leader device can encrypt the received content using a public key associated with an owner of the requesting device or a shared key for the group of co-located user devices 120 generated upon election of the leader device.

Figure 5:
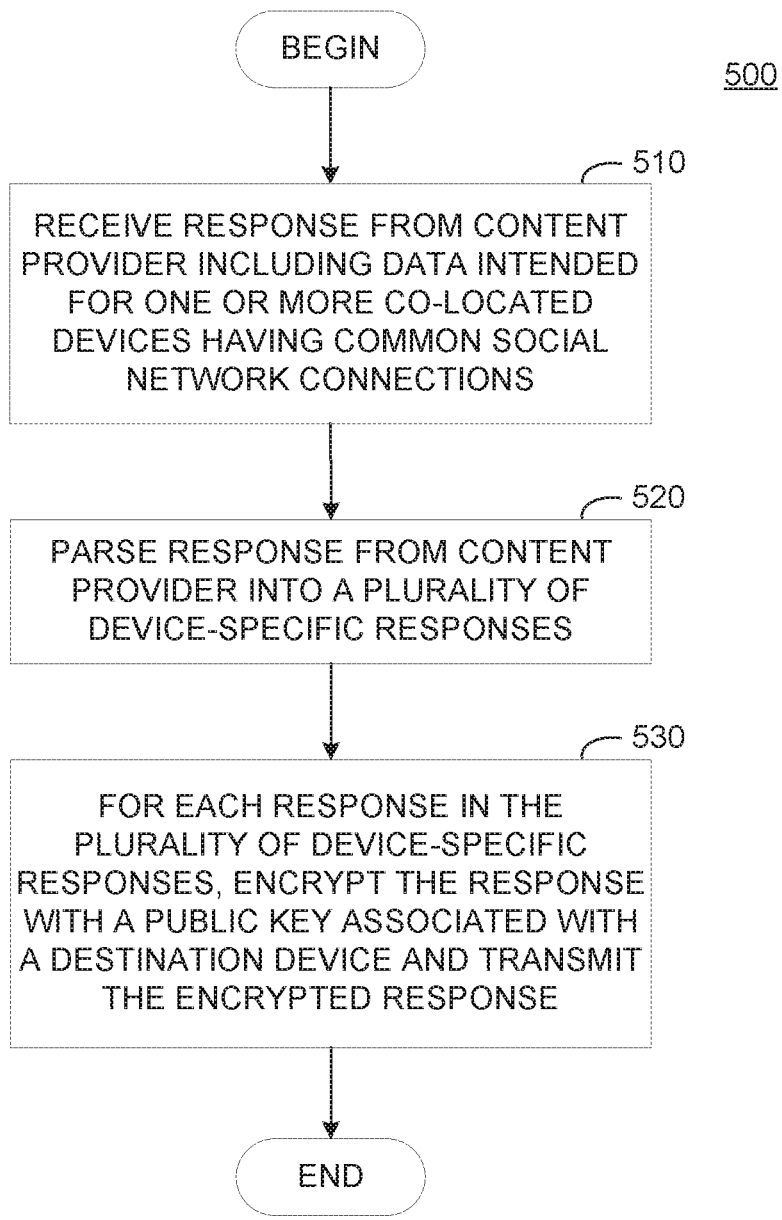
FIG. 5 illustrates example operations for distributing content to a plurality of co-located peer devices from an elected leader device, according to one embodiment.

FIG. 5 illustrates example operations for distributing content from an elected leader device to a plurality of co-located user devices having common social network connections with the elected leader device, according to an embodiment. As illustrated, operations 500 begin at step 510, where the elected leader device receives a response from a content provider. The response may include data intended for one or more co-located devices having common social network connections. The response may be formatted as a series of two-tuples of {content, [requesting user devices]}.

At step 520, the elected leader device parses the response from the content provider into a plurality of device-specific responses. To generate a device-specific response, the elected leader device can examine each element in the series of {content, [requesting user devices]} two-tuples to identify content that is intended for a specific user device (e.g., a device identifier associated with the specific user device is included in the set of requesting user devices). The elected leader device can append each item of requested content to the end of a device-specific response message until the elected leader device completes examining the response from the content provider.

At step 530, for each response in the plurality of device-specific responses, the elected leader device encrypts the response with the public key associated with an owner of the user device and transmits the encrypted response to the requesting user device.

Figure 6:
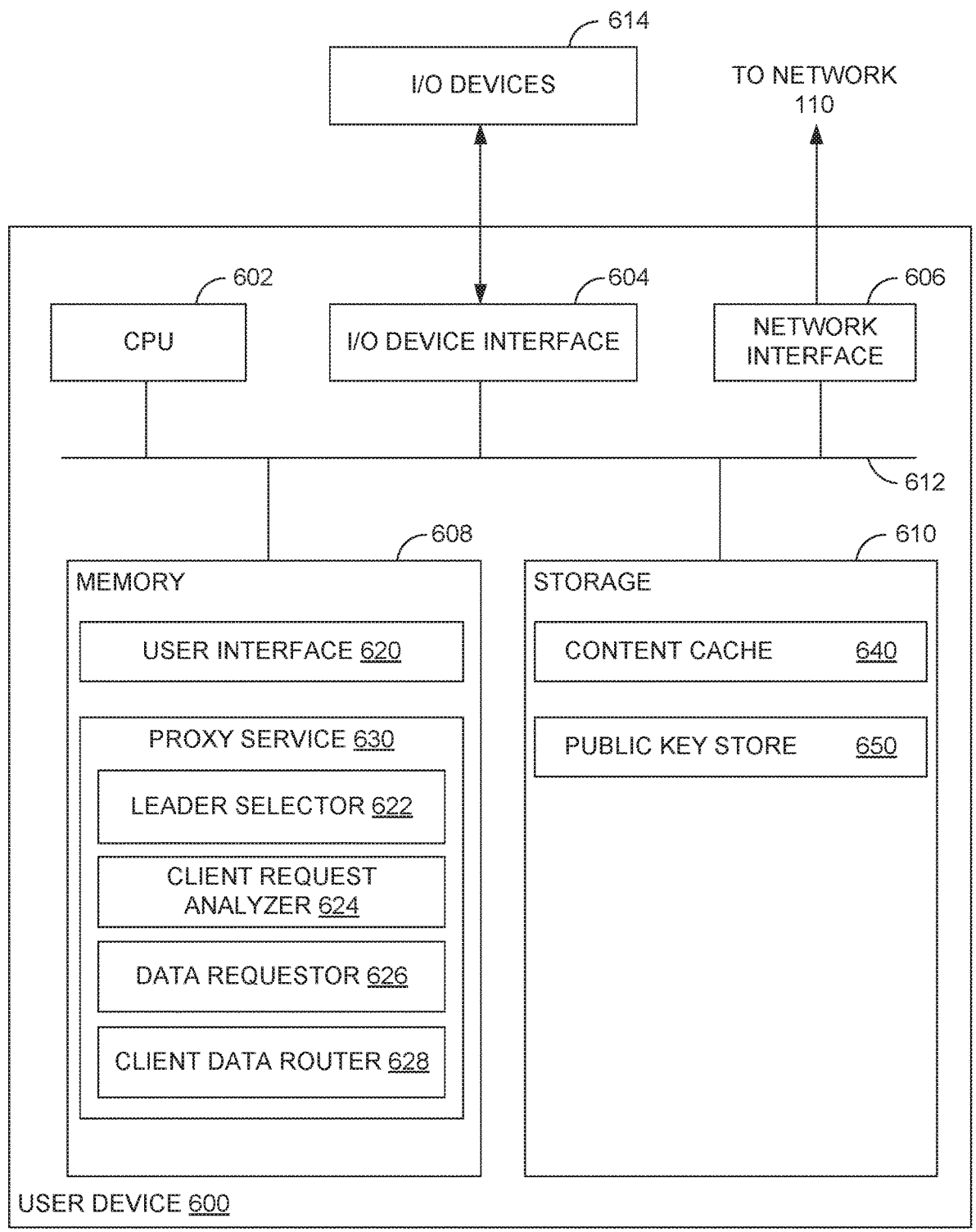
FIG. 6 illustrates an example system in which social network connection information is used to select a leader device for obtaining and caching secure content, according to one embodiment.

FIG. 6 illustrates an example user device 600 that uses social network connection information to elect a leader device for communicating with a content provider, according to an embodiment. As shown, the server includes, without limitation, a central processing unit 602, one or more I/O device interfaces 604, which may allow for the connection of various I/O devices 614 (e.g., keyboards, displays, mouse devices, pen input, etc.) to the computing system 600, network interface 606, a memory 608, storage 610, and an interconnect 612.

CPU 602 may retrieve and execute programming instructions stored in the memory 608. Similarly, the CPU 602 may retrieve and store application residing in the memory 608. The interconnect 612 transmits programming instructions and application data among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a user interface 620 and a proxy service 630. User interface 620 generally provides an interface for a user of user device 600 to request data from content provider 130. When a user requests data via user interface 620, user interface 620 generates a request for data that is transmitted to the elected master device for a group of co-located devices whose owners share social network connections. User interface 620 can encrypt the request with a public key associated with an owner of the elected leader device and transmit the request to proxy service 630 at the elected leader device. If the user device 600 is also the elected leader device, user interface 620 can provide the request to proxy service 630 at user device 600. In such a case, the request may, but need not, be encrypted.

Proxy service 630 generally receives requests for data provided by content provider 130 from one or more devices in a group of co-located devices whose owners share social network connections. As illustrated, proxy service 630 includes a leader selector 622, client request analyzer 624, data requestor 626, and client data router 628.

Leader selector 622 may receive information from one or more user device 120 and/or content provider 130 indicating location information for each user device 120 (e.g., an identifier of the access point/base station that each user device 120 is connected to, satellite positioning system information, and other location information) and social network connection information for the owner of each user device 120. Using the location and social network connection information, leader selector 622 can identify a group of co-located user devices whose owners share social network connections. Leader selector 122 can further request information from each user device 120 in the identified group of co-located user devices about the capabilities and state of each device (e.g., network connections, available bandwidth, remaining battery life, whether the device is plugged into mains power, and so on). Using the information about the capabilities and state of each device in the identified group, leader selector 122 can elect a leader device that the group of co-located user devices 120 uses to communicate with content provider 130.

After electing a leader device for the group of co-located user devices 120, leader selector 622 can request the public keys for each of the members of the group of co-located user devices other than the elected leader device (e.g., user device 600). Proxy service 630 may store the public keys in a repository at storage 610. As discussed herein, proxy service 630 can use the private key associated with an owner of the elected leader device or a shared key for the group of co-located user devices 120 to decrypt requests for data from user devices 120 in the identified group. The requests for data, as discussed herein, may be encrypted using a public key associated with an owner of the elected leader device or the shared key. After retrieving data from a content provider 130 or a content cache 640, proxy service 630 can encrypt the requested data (e.g., using a public key associated with an owner of the elected leader device or the shared key established for the group of co-located user devices) before transmitting the data to the user devices 120 in the identified group of co-located devices.

Client request analyzer 624 generally receives requests for data from one or more of the user devices in the identified group of co-located devices and determines whether to provide the requested data from a content cache at the elected leader device or request the data from a content provider 130. The requests for data received from a device may be encrypted using a public key associated with the owner of the elected leader device or the shared key established for the group of co-located user devices. Proxy service 630 uses the private key associated with the owner of the elected leader device or the shared key to decrypt the received request for data and identify the data that the user device has requested.

To determine whether to provide the requested content from a content cache (e.g., content cache 640 in storage 610) or to request the content from a content provider 630, client request analyzer can use a data identifier included in the request to search the content cache for matching data. If the content cache returns a non-null response (i.e., the requested data exists in the cache from a previous request for the same data), client request analyzer 624 can provide the requested data from the content cache to client data router 628 for transmission to a requesting user device 120. Otherwise, the requested data does not exist in the cache, and user device 600 may request the data from content provider 130 (e.g., via data requestor 626) before providing the data to the requesting user device 120.

Data requestor 626 generally aggregates data requests from multiple user devices 120 that cannot be satisfied from a content cache and transmits the aggregated request to content provider 130. The aggregated request may include a plurality of two-tuples of {data identifier, [requesting devices]} which identifies the data to retrieve from content provider 130 and the one or more devices that have requested the data. To preserve end-to-end encryption, data requestor 626 can encrypt the aggregated request using a public key associated with the owner of user device 600 before transmitting the aggregated request to content provider 130.

In response, data requestor receives a response from content provider 130 including the requested data and routing information identifying which devices in the group of co-located devices are to receive each item of data included in the response. The response received from content provider 130 may be encrypted using a public key associated with the owner of user device 600, and user device 600 can use the private key associated with the owner of user device 600 to decrypt the response and provide the data to client data router for transmission to the group of co-located devices. In some cases, data requestor 626 may save the requested content and the associated content identifiers in a content cache (e.g., content cache 640 at storage 610), which allows user device 600 to provide already-retrieved content to requesting user devices 120 without requesting the same content from content provider 130.

Client data router 628 generally receives, from client request analyzer 624 and/or client requestor 626, content to be transmitted to the group of co-located devices and routing information indicating which devices are to receive each item of content. For each device in the group of co-located devices using user device 600 as the elected leader device, client data router 628 generates an aggregated response message including the data identified as having been requested by that user device 120. Client data router 628 encrypts the aggregated response message using the public key associated with the owner of the user device 120 and transmits the encrypted message to the user device 120.

As shown, storage 610 includes a content cache 640 and public key store 650. Content cache 640 stores data that has been previously requested by a user device 120 in a group of co-located user devices owned by users sharing common social network connections. When a user device initially requests content from a content provider 130, proxy service 630 generates a request for that content from the content provider 130 and stores the content in content cache 640. Proxy service 124 may serve subsequent requests for that data from content cache 640.

Public key store 650 provides a repository in which proxy service 630 stores the public encryption keys associated with owners of the co-located user devices that use have elected user device 600 to be the leader device in communicating with content provider 130. The public keys, as discussed herein, may be used to encrypt data transmissions to the co-located user devices, which may preserve end-to-end encryption of data between content provider 130 and each user device 120.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data (e.g., multimedia content and other information stored in a social networking system) available in the cloud. For example, user content may be stored in the cloud, and an elected leader device in a group of co-located user devices whose owners share social network connections can initially retrieve user content from the cloud. As discussed herein, user content retrieved from the cloud may be cached at the elected leader device, which may reduce a number of times that the content is downloaded from the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for caching secure content at a device in a group of co-located devices, comprising:
electing the device as a leader device in the group of co-located devices based, at least in part, on shared social network connections associated with owners of each device in the group of co-located devices;
receiving, from a first user device in the group of co-located devices, a first request for first data available from a content provider;
upon finding the first data in a cache at the device:
encrypting the first data using an encryption key associated with an owner of the first user device; and
transmitting the encrypted first data to the first user device;
receiving, from the first user device, a second request for second data available from the content provider; and
upon determining that the second data is not available in the cache:
generating an encrypted request to obtain the second data from the content provider, wherein the encrypted request comprises an aggregated request;
transmitting the encrypted request to the content provider;
receiving a response from the content provider, the response including a plurality of content items and a list of destination devices associated with each of the plurality of content items;
decrypting the response; and
using the encryption key associated with the owner of the first user device, generating an encrypted message including the second data, wherein generating the encrypted message comprises:
generating a response message intended for the first user device;
upon determining that the first user device is included in the list of destination devices associated with the second data, appending the second data to the response message;
encrypting the response message using the encryption key associated with the owner of the first user device; and
transmitting the encrypted message to the first user device.

2. The method of claim 1, further comprising:
upon electing the device as the leader device, requesting encryption keys from each device in the group of co-located devices.

3. The method of claim 1, wherein the encryption key associated with the owner of the first user device comprises at least one of: a public key associated with the owner of the first user device or a shared encryption key established for the group of co-located devices.

4. The method of claim 1, further comprising:
upon decrypting the second data in the response, storing the second data in the cache at the device.

5. The method of claim 4, wherein storing the second data in the cache further comprises associating an expiration time with the second data, the expiration time indicating a time at which the device deletes the second data from the cache.

6. The method of claim 1, wherein the device transmits the encrypted request to the content provider using a first network connection and transmits content to one or more devices in the group of co-located devices using a second network connection.

7. An apparatus, comprising:
a processor; and
a memory having instructions which, when executed by the processor, performs an operation for caching secure content at a device in a group of co-located devices, the operation comprising:

electing the device as a leader device in the group of co-located devices based, at least in part, on shared social network connections associated with owners of each device in the group of co-located devices;

receiving, from a first user device in the group of co-located devices, a first request for first data available from a content provider;

upon finding the first data in the cache at the device:
- encrypting the first data using an encryption key associated with an owner of the first user device; and
- transmitting the encrypted first data to the first user device;

receiving, from the first user device, a second request for second data available from the content provider; and upon determining that the second data is not available in the cache:
- generating an encrypted request to obtain the second data from the content provider, wherein the encrypted request comprises an aggregated request;
- transmitting the encrypted request to the content provider;
- receiving a response from the content provider, the response including a plurality of content items and a list of destination devices associated with each of the plurality of content items;
- decrypting the response; and
- using the encryption key associated with the owner of the first user device, generating an encrypted message including the second data, wherein generating the encrypted message comprises:
  - generating a response message intended for the first user device;
  - upon determining that the first user device is included in the list of destination devices associated with the second data, appending the second data to the response message; and
  - encrypting the response message using the encryption key associated with the owner of the first user device; and
- transmitting the encrypted message to the first user device.

8. The apparatus of claim 7, wherein the encryption key associated with the owner of the first user device comprises at least one of: a public key associated with the owner of the first user device or a shared encryption key established for the group of co-located devices.

9. The apparatus of claim 7, wherein the operation further comprises:
upon decrypting the the second data in the response, storing the second data in the cache at the device.

10. The apparatus of claim 7, wherein the device transmits the encrypted request to the content provider using a first network connection and transmits content to one or more devices in the group of co-located devices using a second network connection.

11. A non-transitory computer-readable storage medium comprising instructions which, when executed by a processor, performs an operation for caching secure content at a device in a group of co-located devices, the operation comprising:

electing the device as a leader device in the group of co-located devices based, at least in part, on shared social network connections associated with owners of each device in the group of co-located devices;

receiving, from a first user device in the group of co-located devices, a first request for first data available from a content provider;

upon finding the first data in a cache at the device:
- encrypting the first data using an encryption key associated with an owner of the first user device; and
- transmitting the encrypted first data to the first user device;

receiving, from the first user device, a second request for second data available from the content provider; and upon determining that the second data is not available in the cache:
- generating an encrypted request to obtain the second data from the content provider, wherein the encrypted request comprises an aggregated request;
- transmitting the encrypted request to the content provider;
- receiving a response from the content provider, the response including a plurality of content items and a list of destination devices associated with each of the plurality of content items;
- decrypting the response; and
- using the encryption key associated with the owner of the first user device,
- generating an encrypted message including the second data, wherein generating the encrypted message:
  - generating a response message intended for the first user device;
  - upon determining that the first user device is included in the list of destination devices associated with the second data, appending the second data to the response message; and
  - encrypting the response message using the encryption key associated with the owner of the first user device; and
- transmitting the encrypted message to the first user device.

12. The non-transitory computer-readable storage medium of claim 11, wherein the encryption key associated with the owner of the first user device comprises at least one of: a public key associated with the owner of the first user device or a shared encryption key established for the group of co-located devices.

13. The non-transitory computer-readable storage medium of claim 11, wherein the operation further comprises:
upon decrypting the the second data in the response, storing the second data in the cache at the device.

14. The non-transitory computer-readable storage medium of claim 11, wherein the device transmits the encrypted request to the content provider using a first network connection and transmits content to one or more devices in the group of co-located devices using a second network connection.

* * * * *